United States Patent
Kwon

(10) Patent No.: US 8,312,788 B2
(45) Date of Patent: *Nov. 20, 2012

(54) SLIDE-AND-SNAP LOCK ASSEMBLY

(75) Inventor: Young Dae Kwon, CheonAn (KR)

(73) Assignee: Infac Corporation, Cheonan-Si, Chungcheongnam-Do (KR)

( * ) Notice: Subject to any disclaimer, the term of this patent is extended or adjusted under 35 U.S.C. 154(b) by 815 days.

This patent is subject to a terminal disclaimer.

(21) Appl. No.: 12/175,558

(22) Filed: Jul. 18, 2008

(65) Prior Publication Data

US 2009/0019965 A1 Jan. 22, 2009

Related U.S. Application Data

(60) Provisional application No. 60/950,636, filed on Jul. 19, 2007.

(51) Int. Cl.
*F16C 1/26* (2006.01)

(52) U.S. Cl. ...................... 74/502.4; 74/502.6

(58) Field of Classification Search .......... 74/501.5 R, 74/501.6, 502, 502.4, 502.6; 403/202, 203, 403/239, 220, 256, 257, 328, 316, 302, 294, 403/325; 248/56, 222.11; *F16C 1/26*
See application file for complete search history.

(56) References Cited

U.S. PATENT DOCUMENTS

| | | | | |
|---|---|---|---|---|
| 5,347,882 A | * | 9/1994 | Klotz | 74/502.4 |
| 5,383,377 A | * | 1/1995 | Boike | 74/502 |
| 5,560,259 A | | 10/1996 | Reasoner | |
| 5,579,662 A | * | 12/1996 | Reasoner | 74/502.4 |
| 5,598,743 A | | 2/1997 | Yasuda | |
| 6,332,806 B1 | * | 12/2001 | Yasui et al. | 439/545 |
| 6,340,265 B1 | * | 1/2002 | Suzuki et al. | 403/316 |
| 6,634,252 B2 | * | 10/2003 | Mayville et al. | 74/502.6 |
| D495,725 S | | 9/2004 | Kwon | |
| 2005/0160866 A1 | * | 7/2005 | Dona-Contero | 74/502.6 |

FOREIGN PATENT DOCUMENTS

| | | | |
|---|---|---|---|
| DE | 19840642 A1 | * | 3/2000 |
| FR | 2841614 A1 | * | 1/2004 |
| JP | 2000039016 A | * | 2/2000 |
| KR | 20-0226031 | | 11/2003 |

* cited by examiner

*Primary Examiner* — Richard W Ridley
*Assistant Examiner* — Thomas Diaz
(74) *Attorney, Agent, or Firm* — Dickinson Wright PLLC

(57) ABSTRACT

A motion transmitting remote control assembly (20) of the type for transmitting motion in a curved path by a flexible core element (22) in a conduit (24) is secured to a support structure (76) having a U-shaped slot. A support body (66) defines a groove (84) having first and second legs (86, 88) for abutting parallel edges (78) of the U-shaped slot, and a bottom leg (90) connecting the first and second legs (86, 88) for abutting a bottom edge (80). Slider arms (94) movably supported within female guides (92) are urged against snap-in retainers (102) by biasing spring members (104) establishing a locking position. A pair of locking tabs (106) projecting from the slider arms (94) into the groove (84) engage notches (82) in the parallel edges (78). An inclined face (112) is defined along the lower surface (112) of the locking tabs (106) for wedging engagement with the parallel edges (78) of the U-shaped slot to move the slider arms (94) axially to an insertion position.

2 Claims, 4 Drawing Sheets

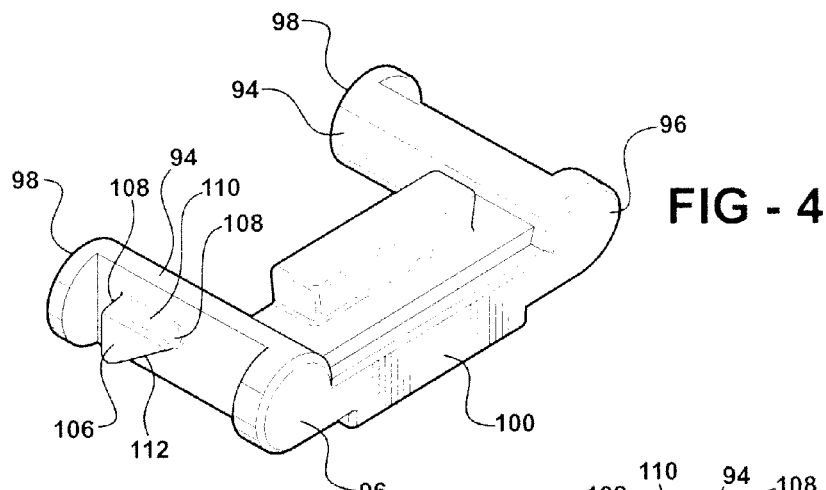
FIG - 4
FIG - 5
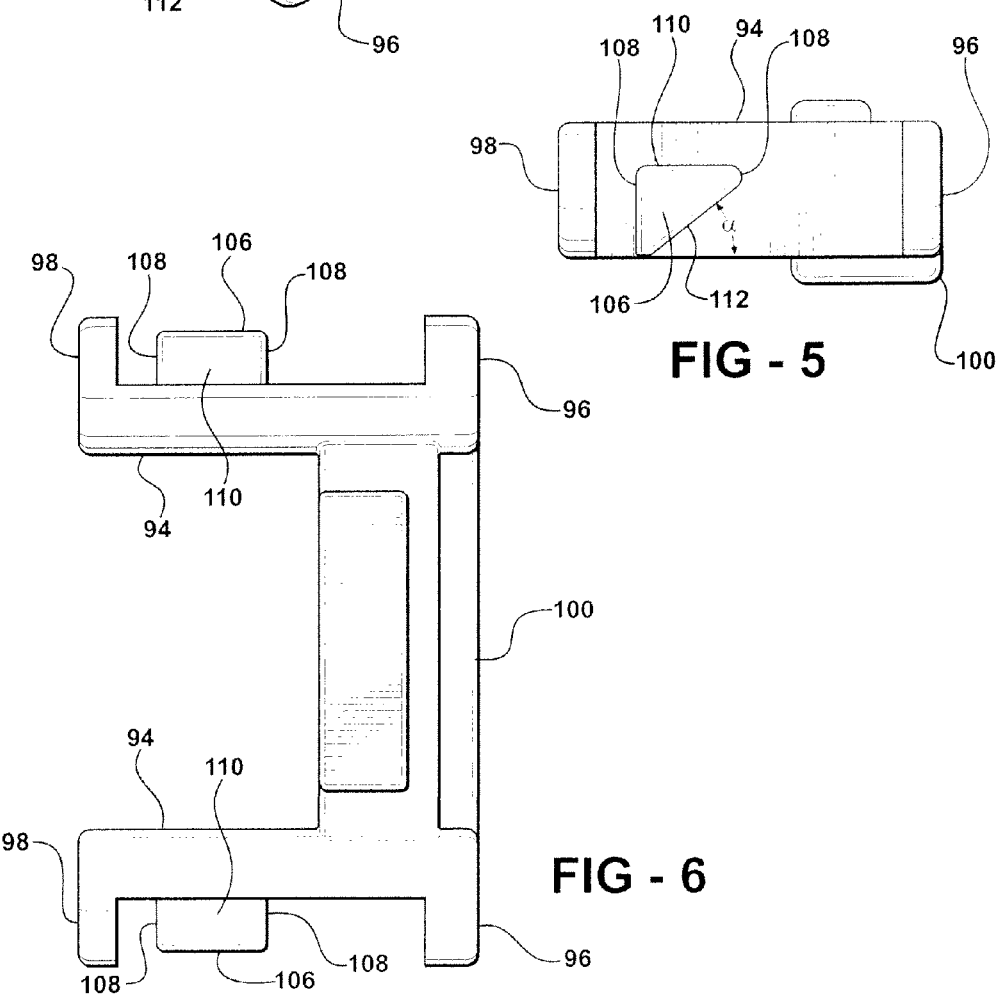
FIG - 6

SLIDE-AND-SNAP LOCK ASSEMBLY

CROSS REFERENCE TO RELATED APPLICATION

This application claims the benefit of application Ser. No. 60/950,636 filed Jul. 19, 2007.

BACKGROUND OF THE INVENTION

1. Field of the Invention

The subject invention relates generally to a motion transmitting remote control assembly for transmitting motion in a curved path by a flexible motion transmitting core element.

2. Description of the Prior Art

Such motion transmitting remote control assemblies for transmitting motion in a curved path are typically used for positioning of transmission shift members in automobiles, throttle controls, hood latches, and the like. These assemblies include a flexible motion transmitting core element and a conduit extending along an axis, movably supporting the core element. The core element is adapted at one end to be attached to a member to be controlled (such as an automobile transmission), and at another end to a manual actuator (such as a transmission shift lever).

The Korean Registration No. 20-0226031, and the U.S. Design Pat. No. D495,725 issued to Kwon, both provide a support body extending along the axis and surrounding conduit. The support body supports the assembly in a U-shaped slot in a support structure. The U-shaped slot is defined by parallel edges and a bottom edge extending along an arc connecting the parallel edges. A pair of notches are defined along the parallel edges. The support body defines a groove extending in a U-shape having a first leg and a second leg for abutting the parallel edges of the slot, and a bottom leg for abutting the bottom edge of the U-shaped slot. A pair of female guides are defined on the support body, and a pair of slider arms are movably supported in the female guides and extend axially through the first and second legs of the groove. A cross member extends transversely between the slider arms and has a grip surface. A pair of snap-in retainers abut the slider arms to prevent the slider arms from moving out of the female guides and to establish a locking position. A pair of biasing spring members are disposed within the female guides and abut distal ends of the slider arms. The biasing spring members urge the slider arms into the locking position. A pair of locking tabs project into the first and second legs of the groove to engage notches of the support structure in the locking position.

The locking tabs move axially relative to the support body in response to a manually applied axial force on the grip surface to move the slider arms against the biasing spring members, thereby moving the locking tabs out of the groove, to an insertion position. With the locking tabs in the insertion position, the support body can be inserted onto the support structure. Once the bottom leg of the groove abuts the bottom edge of the U-shaped slot, the axial force being applied to the cross member may be released, and the biasing spring members will urge the locking tabs back into the groove, where the locking tabs will engage the notches, thereby securing the support body to the support structure.

SUMMARY OF THE INVENTION AND ADVANTAGES

The invention provides such an assembly including such a locking tab defining an inclined face for wedging engagement with the parallel edges of the U-shaped slot to move the slider arm axially to the insertion position.

The support body may therefore be moved onto the support structure to engage the inclined face with one of the parallel edges of the U-shaped slot to move the slider arm axially to the insertion position, obviating the need to manually apply an axial force to move the slider arm to the insertion position. The locking tab then moves axially into one of the notches to retain the support body within the U-shaped slot. This significantly reduces labor and time to install such assemblies.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 4 is a perspective view of a pair of slider arms according to the exemplary embodiment;

FIG. 5 is a side view of the slider arms according to the exemplary embodiment; and FIG. 6 is a top view of the slider arms according to the exemplary embodiment.

DETAILED DESCRIPTION OF THE INVENTION

Figure 1:
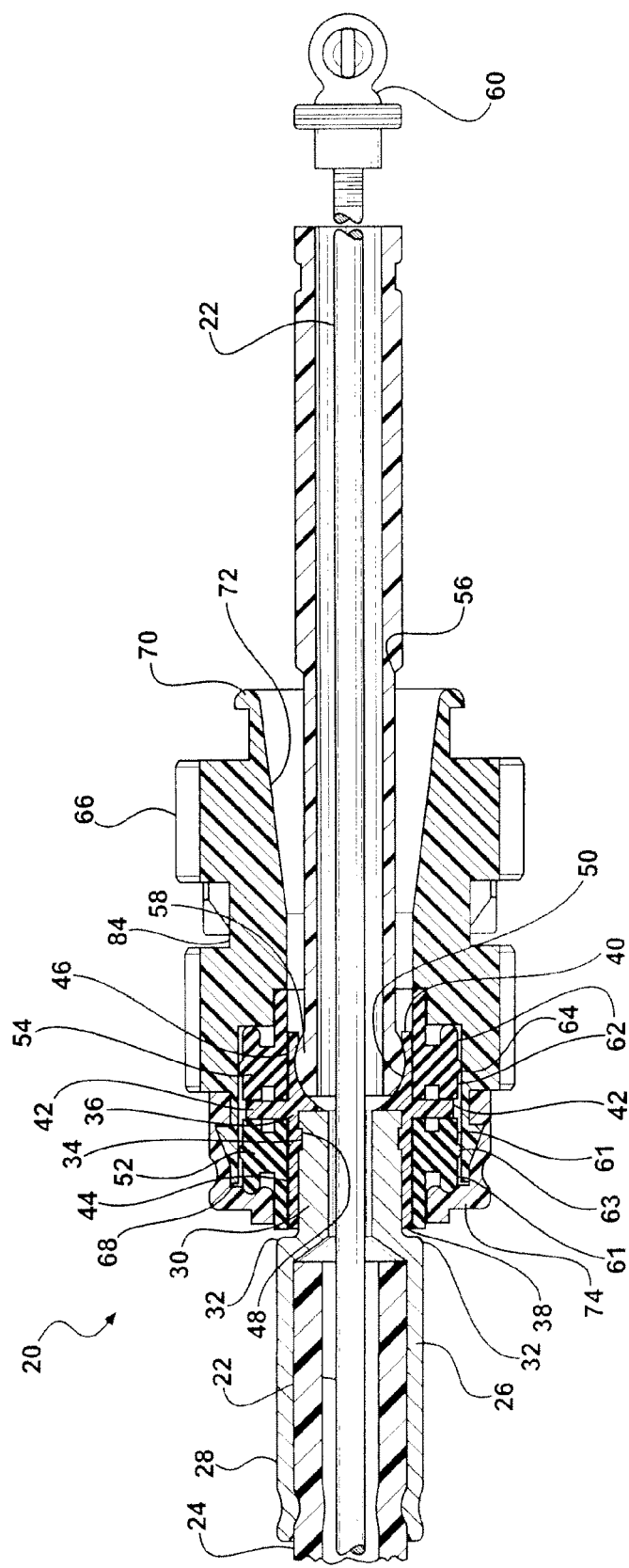
FIG. 1 is a cross section of a motion transmitting remote control assembly according to an exemplary embodiment of the present invention.

Referring to the Figures, wherein like numerals indicate corresponding parts throughout the several views, a motion transmitting remote control assembly is generally indicated at 20. Referring to FIG. 1, the assembly 20 includes a flexible motion transmitting core element 22 for transmitting motion in a curved path. A conduit 24 extends along an axis and movably supports the core element 22. The conduit 24 is of the known type used in motion transmitting remote control assemblies 20 including an inner tubular member of organic polymeric material surrounded by a plurality of long lay wires disposed on a long lead and encased in an outer jacket of organic polymeric material.

A connector 26 extends along the axis and an elongated tubular portion 28 of the connector 26 surrounds the conduit 24 and is crimped thereto. A narrow end portion 30 of the connector 26 is axially shorter than the elongated tubular portion 28 and has a narrower diameter than the elongated tubular portion 28. A shoulder 32 is disposed axially between the elongated tubular portion 28 and the narrow end portion 30. An annular channel 34 extends circumferentially about the narrow end portion 30 of the connector 26.

A coupling body 36 has a tubular shape and extends along the axis between a first end 38 and a second end 40. A flange 42 extends radially about the coupling body 36 and is disposed axially between the first and second ends 38, 40. A first pocket 44 is defined on the first end 38 side of the flange 42, and a second pocket 46 is defined on the second end 40 side of the flange 42. The coupling body 36 surrounds the connector 26 between the first end 38 and the flange 42. A ridge 48 of the coupling body 36 extends radially into the annular channel 34 of the narrow end portion 30 of the connector 26 for securing the connector 26 to the coupling body 36. A spherical pocket 50 is presented within the coupling body 36 between the second end 40 and the flange 42. A first isolator 52 is disposed in the first pocket 44 of the coupling body 36 and extends axially between the flange 42 and the first end 38 of the coupling body 36. A second isolator 54 is disposed in the second pocket 46 of the coupling body 36 and extends from the flange 42 and axially beyond the second end 40 of the coupling body 36. A swivel tube 56 surrounds the core element 22 and has a spherical end 58 supported in the spherical pocket 50 for swiveling movement of the swivel tube 56 relative to the coupling body 36. The core element 22 is connected to an end fitting 60 which is connected to either a member to be controlled, or to a manual actuator.

The first isolator 52 has a first head portion 61 and the second isolator 54 has a second head portion 62. A first rib 63 projects radially from the first head portion 61, and a second rib 64 projects radially from the second head portion 62. The isolators 52, 54 contact a support body 66 along the ribs 63, 64, spacing the first and second head portions 61, 62 from an inner surface of the support body 66.

The support body 66 extends along the axis between a connecting end 68 and a swivel end 70 and surrounds the first and second isolators 52, 54 for isolating the connector 26 from direct contact with the support body 66. The support body 66 surrounds the connector 26 adjacent the connecting end 68, and surrounds the swivel tube 56 adjacent the swivel end 70. A frustoconical inner wall 72 extends axially into the support body 66 from the swivel end 70 to accommodate the swivel tube 56. A cap 74 is secured to the connecting end 68 of the support body 66 for axially abutting the first isolator 52.

Figure 2:
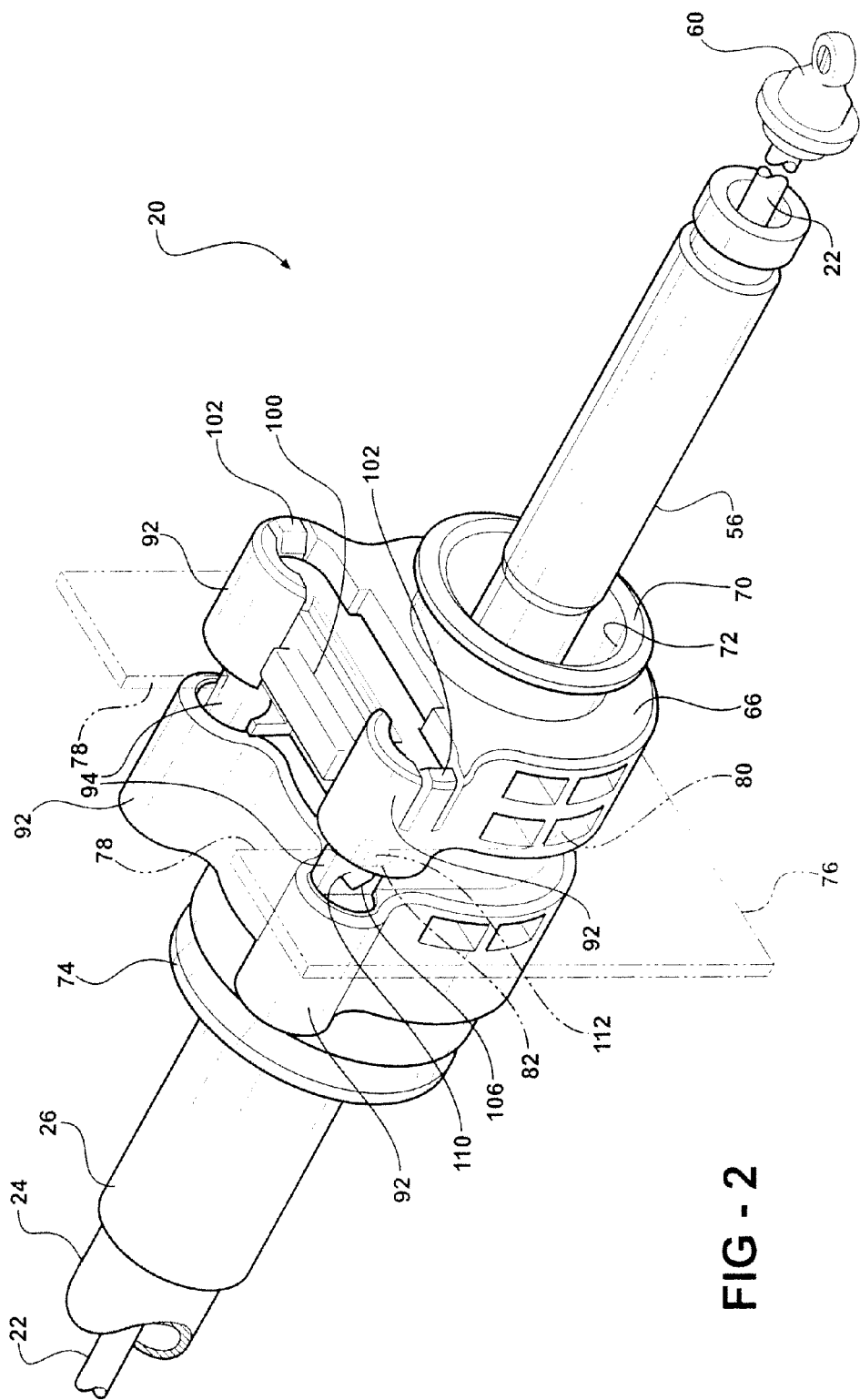
FIG. 2 is a perspective view of the motion transmitting remote control assembly according to the exemplary embodiment.
Figure 3:
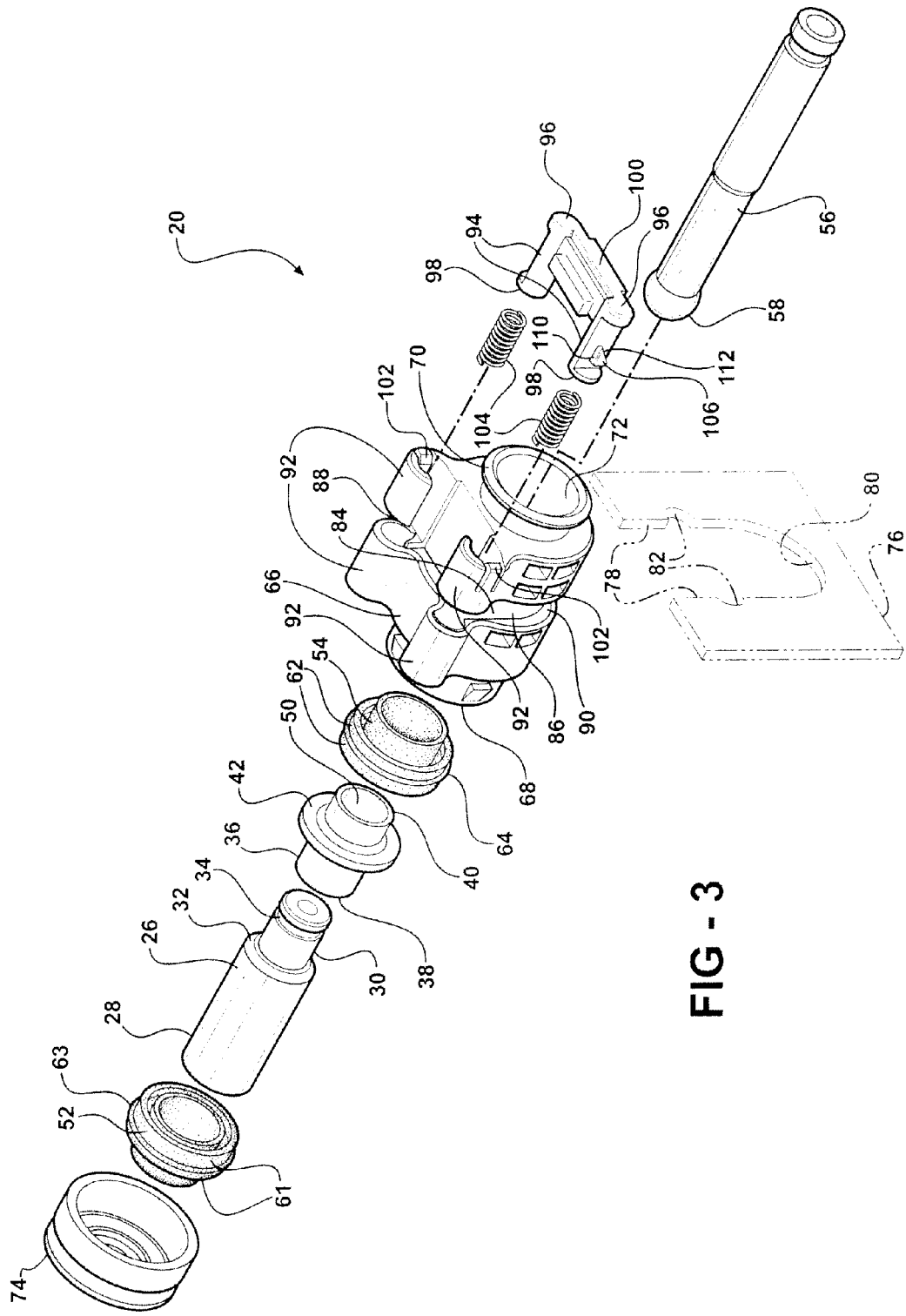
FIG. 3 is an exploded view of the motion transmitting remote control assembly according to the exemplary embodiment.

Referring to FIGS. 2 and 3, the assembly 20 is supported in a plate-like support structure 76 having a U-shaped slot. The U-shaped slot is defined by parallel edges 78 and a bottom edge 80 extending along an arc and connecting the parallel edges 78. The assembly 20 is retained by notches 82 in the parallel edges 78.

A groove 84 is defined on the support body 66, extending in a U-shape. A first leg 86 of the groove 84 abuts one of the parallel edges 78 of the U-shaped slot, and a second leg 88 of the groove 84 abuts another of the parallel edges 78 of the slot when the support body 66 is inserted onto the support structure 76. A bottom leg 90 of the groove 84 extends along an arc between the first and second legs 86, 88 and has the same radius as the bottom edge 80 of the U-shaped slot. The bottom leg 90 of the groove 84 abuts the bottom edge 80 of the U-shaped slot when the support body 66 is inserted onto the support structure 76.

A pair of female guides 92 are defined on the support body 66 and extend axially in opposite directions from the first and second legs 86, 88 of the groove 84. A pair of slider arms 94 extend axially through the first and second legs 86, 88 of the groove 84 from retainer ends 96 to distal ends 98 and are movably supported in the female guides 92. The slider arms 94 include a cross member 100 extending transversely between the retainer ends 96 and have a grip surface disposed thereon. A pair of snap-in retainers 102 are provided to abut the retainer ends 96 of the slider arms 94 to prevent the slider arms 94 from moving out of the female guides 92. A locking position is established when the retainer ends 96 of the slider arms 94 abut the snap-in retainers 102. A pair of biasing spring members 104 are disposed within the female guides 92 and abut the distal ends 98 of the slider arms 94. The biasing spring members 104 exert a biasing force on the distal ends 98 of the slider arms 94 and urge the retainer ends 96 of the slider arms 94 against the snap-in retainers 102, thereby urging the slider arms 94 into the locking position.

A pair of locking tabs 106 project from the slider arms 94 into the first and second legs 86, 88 of the groove 84 to engage the notches 82 of the support structure 76 in the locking position. The locking tabs 106 are movable axially relative to the support body 66 in response to an axial force on the grip surface to move the slider arms 94 axially against the axial biasing force of the biasing spring members 104 to move the locking tabs 106 to an insertion position. While in the insertion position, with the locking tabs 106 moved out of the groove 84, the support body 66 can be inserted onto, or removed from, the support structure 76. With the support body 66 inserted onto the support structure 76, the axial force on the grip surface can be released. The biasing spring members 104 will then urge the retainer ends 96 of the slider arms 94 against the snap-in retainers 102, moving the locking tabs 106 into the first and second legs 86, 88 of the groove 84 to engage the notches 82 in the support structure 76. The locking tabs 106 present boundaries 108 and an upper surface 110 and a lower surface 112 extending between the boundaries 108. The notches 82 engage the locking tabs 106 along the upper surface 110 to retain the support body 66 in the U-shaped slot of the support structure 76.

Referring to FIGS. 4-6, the lower surface 112 of the locking tabs 106 is an inclined face 112 for wedging engagement with the parallel edges 78 of the U-shaped slot. The wedging engagement moves the slider arms 94 axially against the biasing force of the biasing spring members 104, thereby moving the slider arms 94 to the insertion position. This eliminates the need for a manual axial force to be applied to the grip surface, providing an easier insertion motion. However, the upper surface 110 of the locking tabs 106 will prevent inadvertent removal of the support body 66 by requiring the axial force to be applied manually once the support body 66 has been inserted onto the support structure 76.

The inclined face 112 extends along an acute angle $\alpha$ with respect to the axis in order to move the slider arms 94 against the biasing force. According to the exemplary embodiment, the acute angle $\alpha$ is between 30 and 60 degrees.

Obviously, many modifications and variations of the present invention are possible in light of the above teachings and may be practiced otherwise than as specifically described while within the scope of the appended claims. That which is prior art in the claims precedes the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A motion transmitting remote control assembly (20) to be supported in a U-shaped slot in a support structure (76) defined by parallel edges (78) and a bottom edge (80) extending along an arc having a radius and connecting the parallel edges (78) with said assembly (20) retained therein by notches (82) in the parallel edges (78), said assembly (20) comprising;

a flexible motion transmitting core element (22), a conduit (24) extending along an axis and movably supporting said core element (22), a connector (26) extending along said axis having an elongated tubular portion (28) surrounding said conduit (24) and crimped thereto and having a narrow end portion (30) axially shorter than said elongated tubular portion (28) and having a narrower diameter than said elongated tubular portion (28) and having a shoulder (32) disposed axially between said elongated tubular portion (28) and said narrow end portion (30) and defining an annular channel (34) extending circumferentially about said narrow end portion (30), a coupling body (36) having a tubular shape extending along said axis between a first end (38) and a second end (40) and a flange (42) extending radially about said coupling body (36) axially between said first end (38) and said second end (40) defining a first pocket (44) on the first end (38) side of said flange (42) and a second pocket (46) on the second end (40) side of said flange (42), said coupling body (36) surrounding said connector (26) between said first end (38) and said flange (42) and presenting a ridge (48) extending radially into said annular channel (34) of said narrow end portion (30) of said connector (26) for securing said connector (26) to said coupling body (36), said coupling body (36) presenting a spherical pocket (50) between said second end (40) and said flange (42), a first isolator (52) disposed in said first pocket (44) of said coupling body (36) and extending axially between said flange (42) and said first end (38) of said coupling body (36), a second isolator (54) disposed in said second pocket (46) of said coupling body (36) and extending from said flange (42) and axially beyond said second end (40) of said coupling body (36), a swivel tube (56) surrounding said core element (22) and having a spherical end (58) supported in said spherical pocket (50) for swiveling movement of said swivel tube (56) relative to said coupling body (36), a support body (66) extending along said axis between a connecting end (68) and a swivel end (70) and surrounding said first isolator (52) and said second isolator (54) for isolating said coupling body (36) from direct contact with said support body (66), said support body (66) defining a groove (84) extending in a U-shape having a first leg (86) for abutting one of the parallel edges (78) of the U-shaped slot and a second leg (88) for abutting another of the parallel edges (78) of the slot and a bottom leg (90) extending along an arc between said first and second legs (86, 88) having the same radius as the bottom edge (80) of the U-shaped slot for abutting the bottom edge (80) of the U-shaped slot, said support body (66) surrounding said connector (26) adjacent said connecting end (68) and surrounding said swivel tube (56) adjacent said swivel end (70) and including a frustoconical inner wall (72) extending axially into said support body (66) from said swivel end (70), a cap (74) secured to said connecting end (68) of said support body (66) for axially abutting said first isolator (52), said support body (66) defining a pair of female guides (92) extending axially in opposite directions from said first leg (86) and said second leg (88) of said groove (84), a pair of slider arms (94) extending axially through said first and second legs (86, 88) of said groove (84) from retainer ends (96) to distal ends (98) and movably supported in said female guides (92), said slider arms (94) including a cross member (100) extending transversely between said retainer ends (96) and having a grip surface disposed thereon, said support body (66) including a pair of snap-in retainers (102) for abutting said retainer ends (96) of said slider arms (94) for preventing said slider arms (94) from moving out of said female guides (92) to establish a locking position, a pair of biasing spring members (104) disposed within said female guides (92) and abutting said distal ends (98) of said slider arms (94) for exerting a biasing force on said distal ends (98) of said slider arms (94) to urge said slider arms (94) into said locking position, each of said slider arms (94) including a locking tab (106) projecting into said corresponding first and second legs (86, 88) of said groove (84) for engaging the notches (82) of the support structure (76) in said locking position and for moving axially relative to said support body (66) in response to an axial force on said grip surface to move said slider arms (94) axially against the axial biasing force of said biasing spring members (104) to move said locking tabs (106) to an insertion position, said locking tabs (106) presenting boundaries (108) and an upper surface (110) and a lower surface (112) extending between said boundaries (108) for engaging the notches (82) along said upper surface (110) to retain said support body (66) in the U-shaped slot of the support structure (76), characterized by said lower surface (112) of said locking tabs (106) defining an inclined face (112) for establishing wedging engagement with the parallel edges (78) of the U-shaped slot when said support body is inserted into the support structure to move said slider arms (94) axially against the biasing force of said biasing spring members (104) to said insertion position until said locking tabs (106) are aligned with and move axially into said notches (82) to establish said locked position, said upper surface (110) of said locking tabs disposed in abutting relationship with said notch (82) in said locking position for requiring application of axial force to said slider arm to overcome said biasing force and remove said support body (66) from the support structure; and said inclined face (112) extending along an acute angle (α) with respect to said axis between 30 and 60 degrees.

2. An assembly (20) as set forth in claim 1 wherein said upper surface (110) extends parallel to said axis.

* * * * *